(12) United States Patent
Lu

(10) Patent No.: US 7,753,136 B2
(45) Date of Patent: Jul. 13, 2010

(54) RECIPROCATING PNEUMATIC TOOL MECHANISM

(75) Inventor: Kuo-Chou Lu, Taichung Hsien (TW)

(73) Assignee: Cheng Huan Industry Ltd., Dajia Township, Taichung County (TW)

( * ) Notice: Subject to any disclaimer, the term of this patent is extended or adjusted under 35 U.S.C. 154(b) by 146 days.

(21) Appl. No.: 12/205,877

(22) Filed: Sep. 7, 2008

(65) Prior Publication Data

US 2009/0065231 A1 Mar. 12, 2009

(30) Foreign Application Priority Data

Sep. 12, 2007 (TW) .............................. 96133970 A

(51) Int. Cl.
*B25B 9/00* (2006.01)
(52) U.S. Cl. ...................... 173/168; 173/93.5; 173/169; 173/218
(58) Field of Classification Search .................. 173/93, 173/93.5, 168, 169, 210, 211, 218, 213
See application file for complete search history.

(56) References Cited

U.S. PATENT DOCUMENTS

| | | | |
|---|---|---|---|
| 6,158,528 A * | 12/2000 | Izumisawa | 173/168 |
| 6,655,033 B2 * | 12/2003 | Herrmann et al. | 30/276 |
| 6,695,072 B2 * | 2/2004 | Izumisawa | 173/168 |
| 6,932,165 B1 * | 8/2005 | Sun et al. | 173/169 |
| 7,207,394 B2 * | 4/2007 | Young et al. | 173/218 |
| 7,396,197 B2 * | 7/2008 | Lawson | 409/131 |

* cited by examiner

*Primary Examiner*—Scott A. Smith
(74) *Attorney, Agent, or Firm*—Egbert Law Offices PLLC

(57) ABSTRACT

The present invention provides a reciprocating pneumatic tool mechanism, including a casing, pneumatically-operated control module, control switch, actuating module and vibration-absorbing member. The plates of the actuating module are combined into a single body by the perforating locator. The periphery of the plates can be slidably abutted with the inner wall of the tank. The air inlet of actuating module is adapted air-tightly with air supply end of pneumatically-operated control module. At a front end of the actuating module, a protruding tube is screwed into a punch hole in front of the casing. The vibration-absorbing member includes a built-in buffer between actuating module and pneumatically-operated control module, and a front-mounted buffer between the front ends of actuating module and casing. With the invention, the vibration-absorbing members of reciprocating pneumatic tool is saved, improving the assembly efficiency, reducing assembly cost and volume with better economic efficiency.

8 Claims, 7 Drawing Sheets

RECIPROCATING PNEUMATIC TOOL MECHANISM

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a pneumatic tool, and more particularly to an innovative tool with a reciprocating mechanism.

2. Description of Related Art Including Information Disclosed Under 37 CFR 1.97 and 37 CFR 1.98.

Reciprocating pneumatic tools are generally categorized into pneumatic saws, pneumatic hammers and pneumatic choppers depending on their types, as illustrated by the reciprocating pneumatic tool of the present invention.

According to the operating principles of a typical reciprocating pneumatic tool, the source of air pressure is guided into the tool, and then opened or shut-off by the control valve. Next, an action module is used for automatic guiding and switching of an air pressure source, enabling the reciprocating motion of a piston rod along with the tool (e.g. saw blade and hammer).

A vibration-absorbing mechanism is developed in response to a severe vibration problem of a conventional reciprocating pneumatic tool. The major concern of the present invention is the vibration-absorbing mechanism.

The vibration-absorbing mechanism of typical reciprocating pneumatic tool is generally designed with a reference to Taiwan patent bulletin No. 471377 "Suspended Vibration-Absorbing Mechanism of Handheld Power Tool". In this case, the internal action modules are assembled into an independent unit via a suspended sliding sleeve, so that the sliding sleeve can slide in the core of the tool casing. Moreover, a front buffer is arranged between the sliding sleeve and front end of core, and a rear buffer arranged between the sliding sleeve and air guide pedestal. However, the following shortcomings are observed during actual applications.

1. The action module generally comprises several plate members that are assembled internally via a sliding sleeve. From the perspective of assembly, the assembly process of action module members likely leads to aligning inaccuracy, poor assembly efficiency and higher assembly cost.

2. The wall of sliding sleeve must be thick enough to meet the required strength. In this case, the overall volume of action module has to be expanded along with the core of the tool casing, thus increasing substantially the cost of reciprocating pneumatic tool. Furthermore, the external diameter of tool casing must be increased out of tune with thin-profile design trend of products.

Thus, to overcome the aforementioned problems of the prior art, it would be an advancement in the art to provide an improved mechanism that can significantly improve efficacy.

Therefore, the inventor has provided the present invention of practicability after deliberate design and evaluation based on years of experience in the production, development and design of related products.

BRIEF SUMMARY OF THE INVENTION

Based on the invention, the plates of actuating module 40 are combined by the perforating locator 60 into a single body. The assembly process of these plates becomes simpler, faster and more accurate, thus improving markedly the assembly efficiency and reducing the assembly cost with better industrial benefits.

Based on the invention, the plates of actuating module 40 can be slidably abutted with the interior wall of the tank 11 of the casing 10. The sliding sleeve of conventional mechanism in prior art can be eliminated, so the volume of action module 40 and casing can be reduced in tune with thin-profile design trend.

Based on the structure of the invention, a ring liner 49 is placed into the protruding tube 48 of actuating module 40 for penetration of piston rod 461. The ring liner 49 can be designed accordingly into a long-cylinder shape, increasing the sliding contact area and improving the stability and robustness of the piston rod 461.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
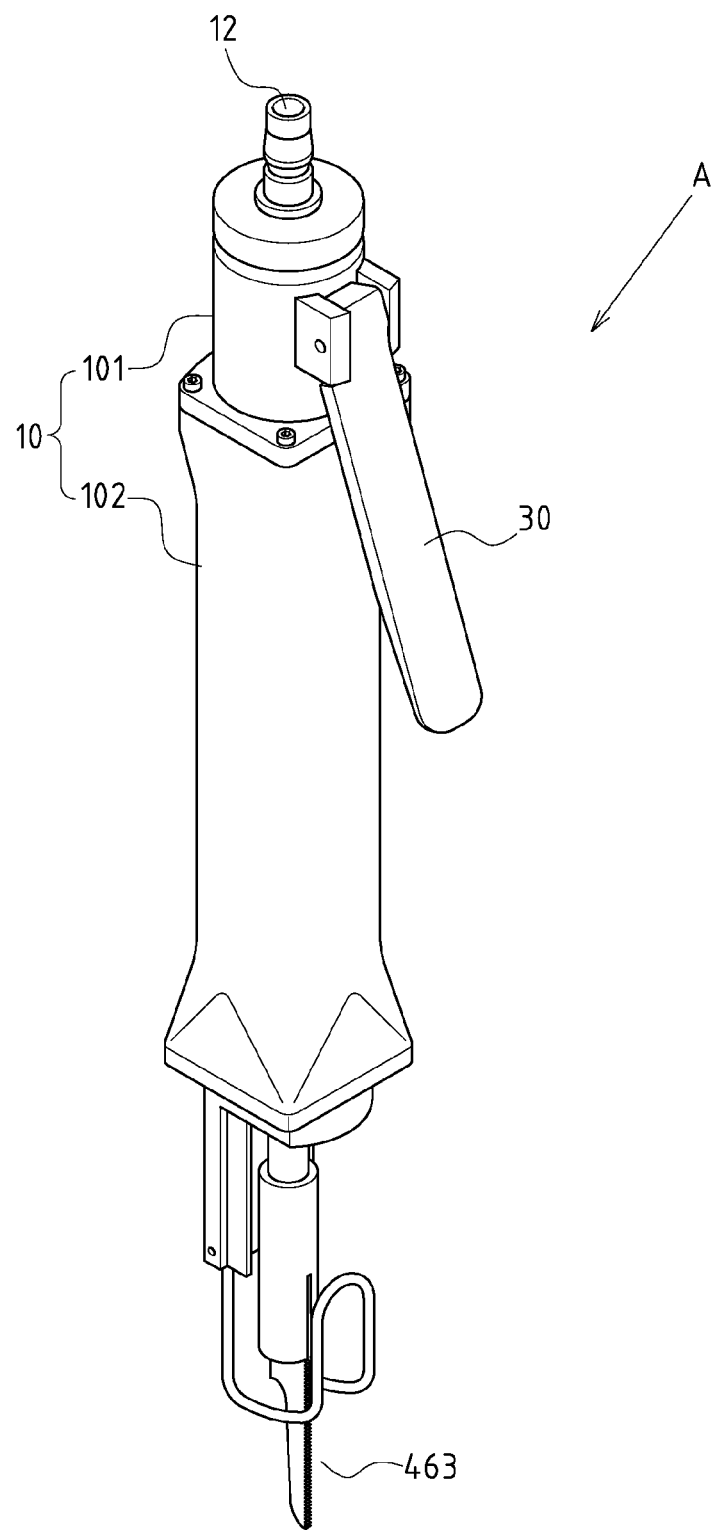
FIG. 1 depicts an assembled perspective view of the preferred embodiment of the present invention.
Figure 2:
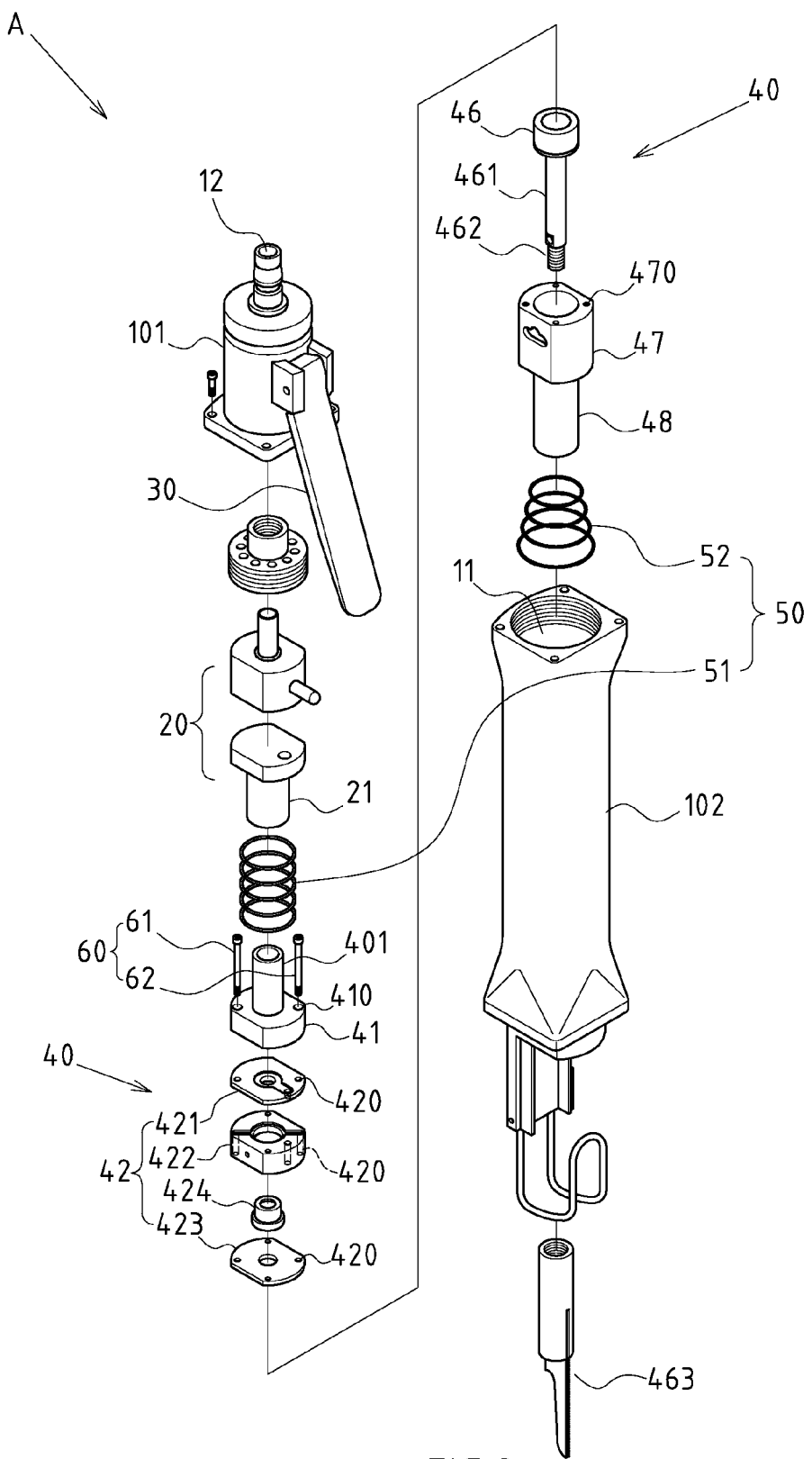
FIG. 2 depicts an exploded perspective view of the preferred embodiment of the present invention.
Figure 3:
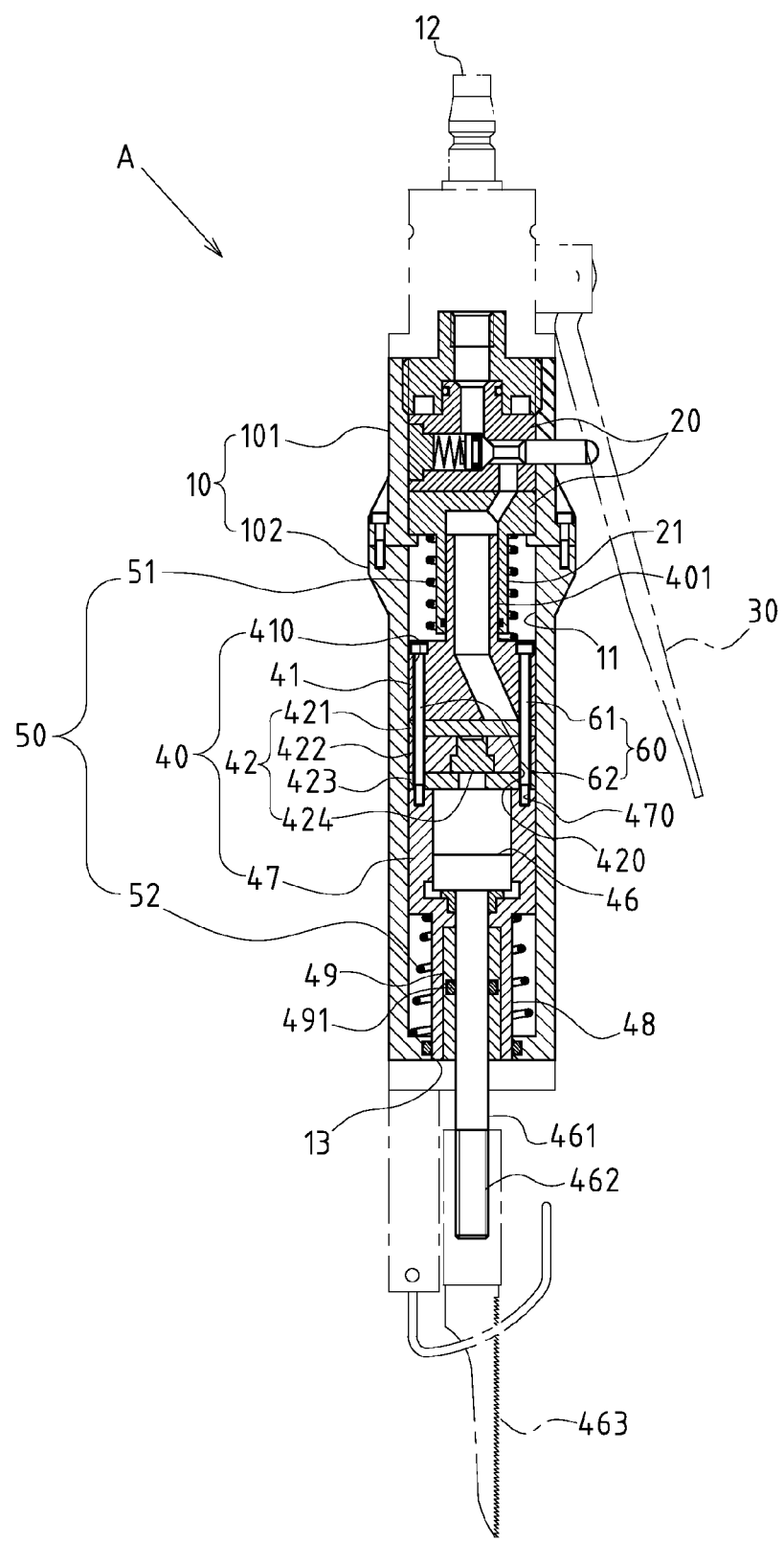
FIG. 3 depicts an assembled sectional view of the preferred embodiment of the present invention.

FIGS. 1-3 depict preferred embodiments of reciprocating pneumatic tool of the present invention. The embodiments are provided only for explanatory purposes with respect to the patent claims.

The reciprocating pneumatic tool A includes a casing 10, a pneumatically-operated control module 20, a control switch 30, an actuating module 40 and vibration-absorbing member 50. The hollow casing 10 is provided internally with an axially-arranged tank 11 to accommodate the pneumatically-operated control module 20, actuating module 40 and vibration-absorbing member 50. The control switch 30 is assembled at one side of the casing 10. At the rear of the casing 10, an air inlet 12 guides air pressure into the pneumatically-operated control module 20. At the front of the pneumatically-operated control module 20, an air supply end 21 is connected with air inlet 401 of the actuating module 40. The actuating module 40 is composed of a plurality of overlapped plates.

In this preferred embodiment, the actuating module 40 comprises a pneumatic guide seat 41, a channel switching member 42, a piston 46 and a cylinder body 47. The channel switching member 42 is composed of a top plate 421, a main seat 422, a bottom plate 423 and a moveable plate 424. At one end of the piston 46, a piston rod 461 penetrates out of the casing 10, forming a tool assembly portion 462 for assembly and positioning of the preset active tool 463 (e.g. saw blade herein).

Figure 4:
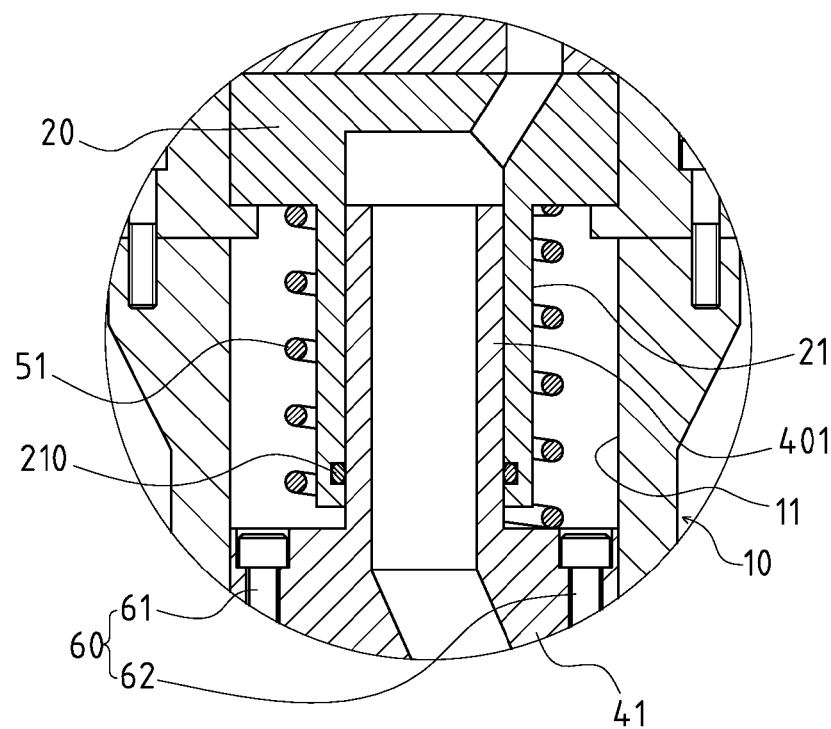
FIG. 4 depicts an enlarged sectional view of assembly position of built-in buffer of the present invention.

The core design of the present invention includes the plates of actuating module 40, being integrally combined into a single body through a perforating locator 60. The perforating locator 60 is composed of a plurality of bolts 61, 62, such that the members (41, 42) of the actuating module 40 are provided correspondingly with punch holes (410, 420). A screw hole 470 is placed at front end of the cylinder body 47 for positioning of the bolts 61, 62. The actuating module 40 is arranged slidably into the tank 11 of the casing 10, such that the periphery of the plates (41, 42, 47) can be slidably abutted with the inner wall of the tank 11. Air inlet 401 of actuating module 40 is adapted air-tightly with air supply end 21 of pneumatically-operated control module 20. At the front end of the actuating module 40, a protruding tube 48 is screwed into a punch hole 13 in front of the casing 10. Referring to FIG. 4, air inlet 401 of the actuating module 40 and air supply end 21 of pneumatically-operated control module 20 can be designed into inner and outer tubes for screwing purposes, and furthermore a seal ring 210 is arranged between inner and outer tubes for realizing air-tightness state.

The vibration-absorbing member 50 comprises a built-in buffer 51 (e.g. a spring) between air inlet 401 of the actuating module 40 and air supply end 21 of pneumatically-operated control module 20, as well as a front-mounted buffer 52 (e.g. a spring) between the front ends of both actuating module 40 and casing 10.

Figure 5:
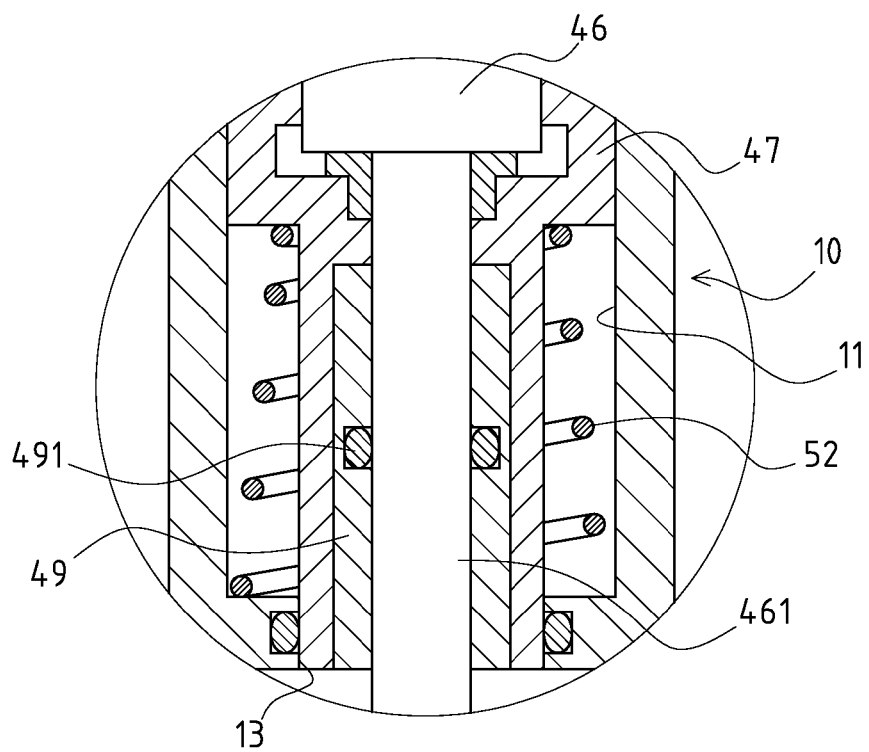
FIG. 5 depicts an enlarged sectional view of assembly position of front-mounted buffer of the present invention.

Referring to FIG. 5, a ring liner 49 is assembled in the protruding tube 48 of actuating module 40, and a piston rod 461 is allowed to penetrate this ring liner 49. The ring liner 49 is provided with an airtight seal ring 491.

Referring to FIGS. 1, 2 and 3, the casing 10 is composed of upper casing 101 and lower casing 102, such that the pneumatically-operated control module 20 is located in the upper casing 101, and actuating module 40 located in the lower casing 102.

Figure 7:
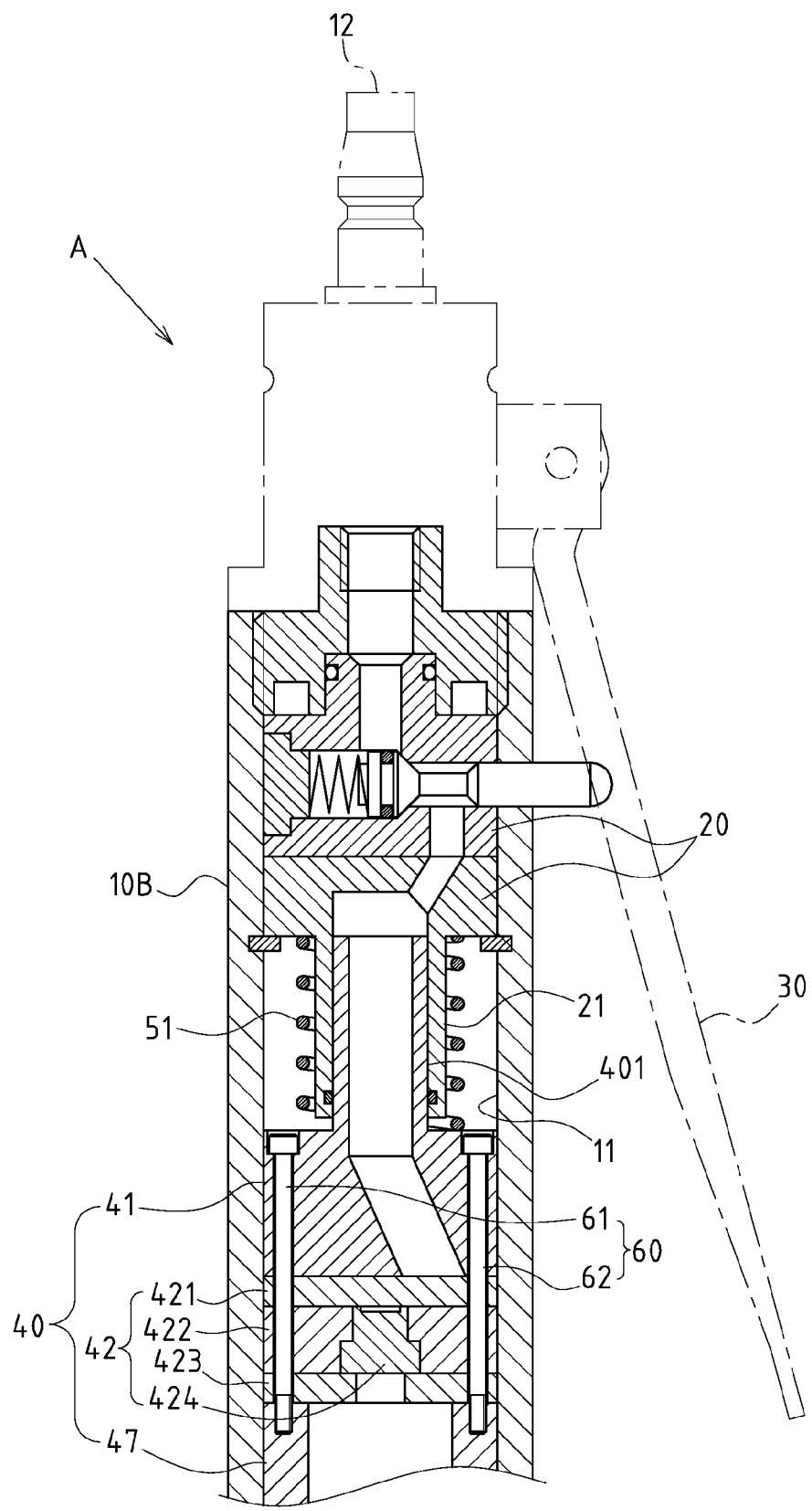
FIG. 7 depicts another sectional view of the application of the casing of the present invention.
Figure 8:
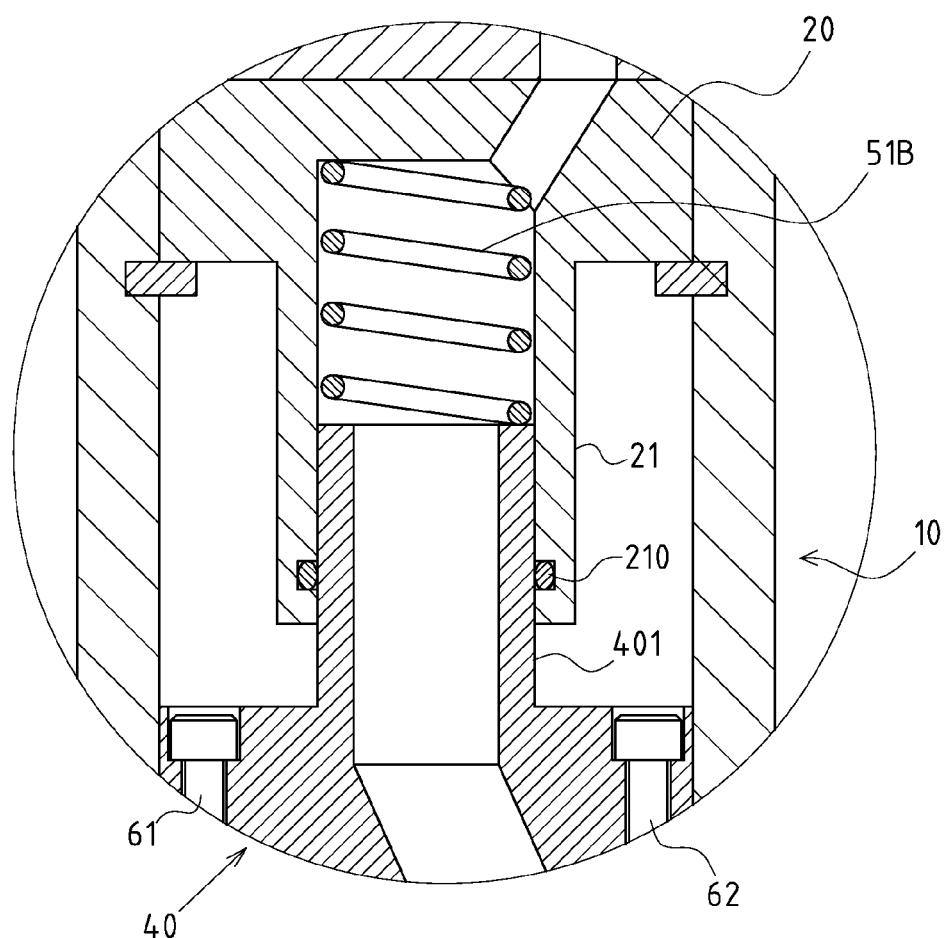
FIG. 8 depicts another sectional view of the application of a front-mounted buffer of the present invention.

Referring to FIG. 7, the casing 10B is also prefabricated as a single body, such that both the pneumatically-operated control module 20 and actuating module 40 are located in said casing 10B.

Referring to FIG. 4, the built-in buffer 51 is assembled externally onto the air inlet 401 and air supply end 21. Referring also to FIG. 7, the built-in buffer 51B is assembled into air supply end 21, and both ends of built-in buffer 51B are separately abutted with the surface of air inlet 401 and interior wall of air supply end 21.

Figure 6:
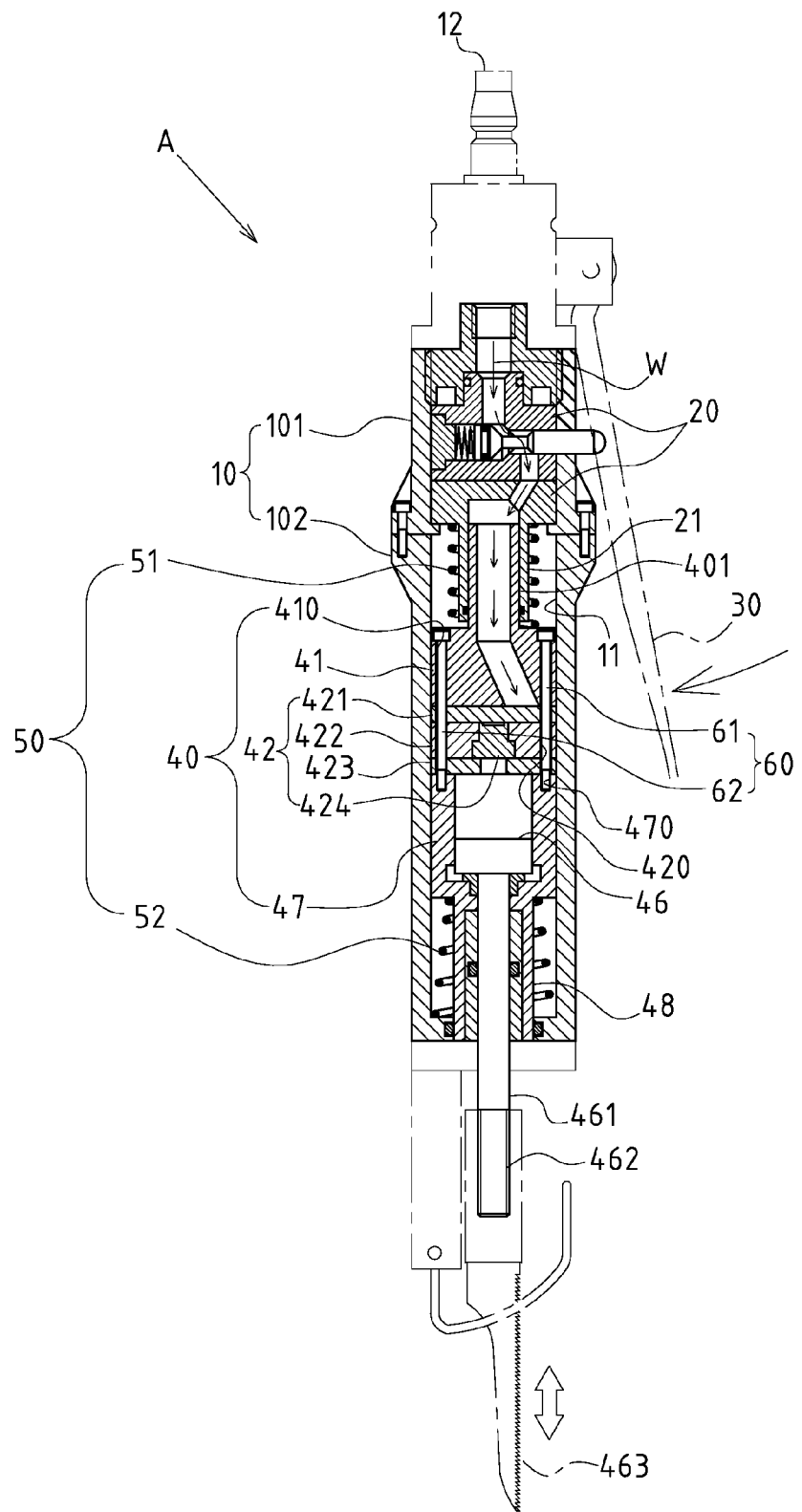
FIG. 6 depicts a sectional view of the operation of the present invention.

Based on above-specified structures, the present invention is operated as follows:

Referring to FIG. 6, the reciprocating pneumatic tool A is operated in such a manner that air flow channel of pneumatically-operated control module 20 is opened by pressing the control switch 30. Then, air pressure (indicated by arrow W) will enter into actuating module 40 through air supply end 21 and air inlet 401. According to the internal flow channel design of actuating module 40 (prior art), air pressure is guided into channel switching member 42 through the pneumatic guide seat 41, and then switched automatically into the cylinder body 47, driving the piston 46 to generate reciprocating motion along with piston rod 461, tool assembly portion 462 and active tool 463.

Yet, the present invention is characterized in that, the plates of actuating module 40 are combined by the perforating locator 60 into a single body, and slidably arranged into the tank 11 of casing 10. The vibration-absorbing member 50 is composed of built-in buffer 51 and front-mounted buffer 52. When the actuating module 40 generates vibration due to reciprocating motion of the coupled components such as piston rod 461, a suspended sliding of actuating module 40 in the tank 11 of casing 10 is achieved through flexible support of built-in buffer 51 and front-mounted buffer 52, thus yielding excellent vibration-absorbing effect.

I claim:

1. A reciprocating pneumatic tool mechanism, comprising:
   a casing, provided internally with a tank, said casing having a rear with an air inlet guiding air pressure and a front with a punch hole;
   a pneumatically-operated control module, mounted into said tank, being provided with an air supply end;
   a control switch, assembled externally onto one side of said casing;
   an actuating module, comprising a plurality of overlapped plates and a piston rod penetrating from said front of said casing, forming a tool assembly portion, said actuating module being provided with an air inlet, the plates being integrally combined into a single body through a perforating locator, said actuating module being arranged slidably into said tank, a periphery of the plates being slidably abutted with an inner wall of said tank, said air inlet of said actuating module being adapted air-tightly with an air supply end of the pneumatically-operated control module, having, at a front end of the actuating module, a protruding tube screwed into a punch hole in said front of said casing; and
   a vibration-absorbing member, comprising:
      a built-in buffer between the air inlet of the actuating module and air supply end of pneumatically-operated control module; and
      a front-mounted buffer between front ends of both actuating module and casing.

2. The mechanism defined in claim 1, wherein the perforating locator for the plates of actuating module is comprised of a plurality of bolts, the plate members of the actuating module being provided correspondingly with punch holes, and a screw hole placed at the end for positioning the bolts.

3. The mechanism defined in claim 1, wherein the air inlet of the actuating module and air supply end of pneumatically-operated control module are formed by inner and outer tubes, a seal ring being arranged between inner and outer tubes for realizing an air-tightness state.

4. The mechanism defined in claim 1, wherein a ring liner is assembled in the protruding tube of actuating module, a piston rod penetrating said ring liner, said ring liner being provided with an airtight seal ring.

5. The mechanism defined in claim 1, wherein said casing is comprised of upper and lower casings, the pneumatically-operated control module being located in the upper casing, the actuating module being located in the lower casing.

6. The mechanism defined in claim 1, wherein said casing is prefabricated as a single body.

7. The mechanism defined in claim 1, wherein the actuating module comprises a pneumatic guide seat, a channel switching member, a piston and a cylinder body, the piston rod being formed at one end of said piston.

8. The mechanism defined in claim 7, wherein said channel switching member is comprised of a top plate, a main seat, a bottom plate and a moveable plate.

* * * * *